J. REGAR.
FAUCET ATTACHMENT.
APPLICATION FILED OCT. 14, 1914.
1,163,457.
Patented Dec. 7, 1915.
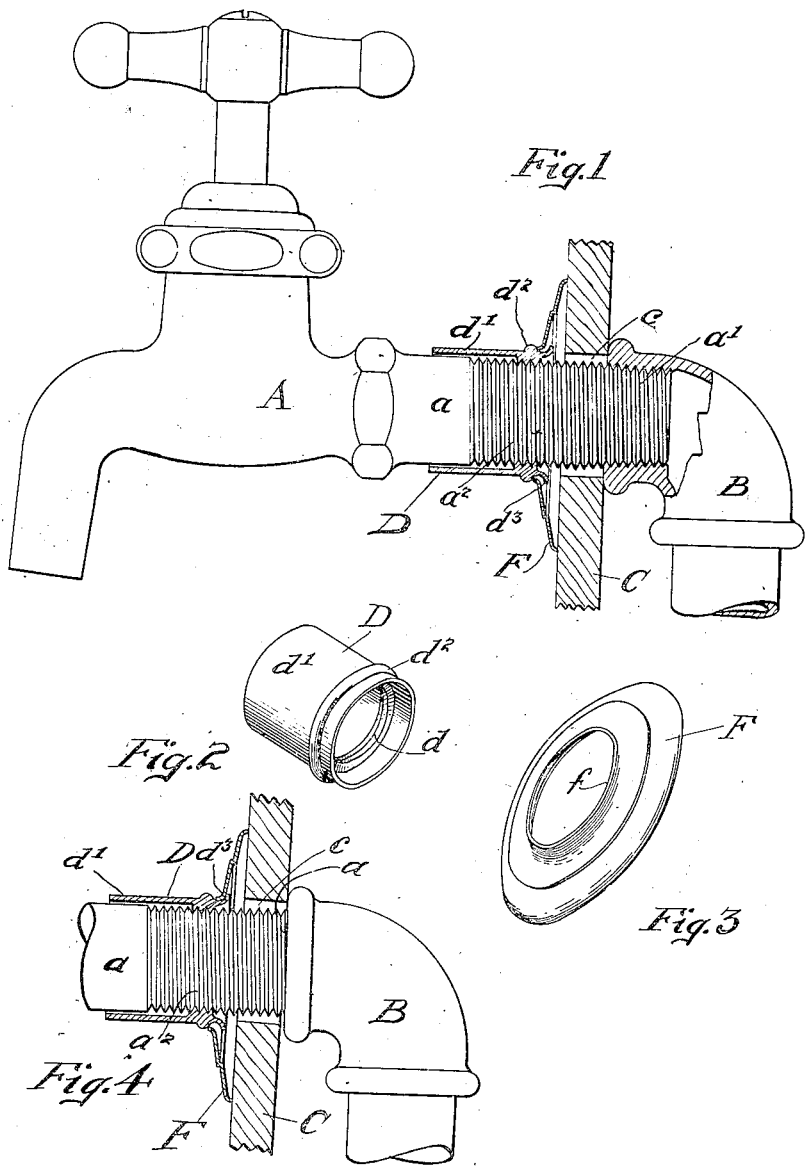

UNITED STATES PATENT OFFICE.

JOSEPH REGAR, OF CLEVELAND, OHIO, ASSIGNOR TO THE REGAR BRASS MANUFACTURING COMPANY, OF CLEVELAND, OHIO, A CORPORATION OF OHIO.

FAUCET ATTACHMENT.

1,163,457. Specification of Letters Patent. Patented Dec. 7, 1915.

Application filed October 14, 1914. Serial No. 866,684.

*To all whom it may concern:*

Be it known that I, JOSEPH REGAR, a citizen of the United States, residing at Cleveland, in the county of Cuyahoga and State of Ohio, have invented a certain new and useful Improvement in Faucet Attachments, of which the following is a full, clear, and exact description, reference being had to the accompanying drawings.

This invention relates to faucets, water cocks, and the like, such as are used, for example, on lavatory backs and in similar locations in household plumbing, and relates particularly to a new and improved form of flange or fitting for such devices adapted to lie snugly against the face of the lavatory back.

In the construction shown in my prior Letters Patent, Re-issue No. 13,786, I have shown a collar having a sleeve and a flange formed integral therewith which avoids close cutting of the pipe fittings and at the same time conceals any threads on the faucet in front of the lavatory back. This construction permits a limited movement of the flange, determined by the amount of play between the sleeve and the threaded portion of the shank, but it is incapable of a close and sanitary fit in cases where the back is inclined at a considerable angle to the axis of the faucet.

The present invention relates to a construction providing a face plate capable of a wide range of adjustment with relation to a suitable ring which is adjustably mounted on the shank of the faucet, so that the face plate will make a close and sanitary fit with a back or wall which may be inclined at a considerable angle from the vertical and which construction can be manufactured with less material than prior constructions with a corresponding saving in cost.

Another object of the invention is to provide a face plate independently movable with relation to the other part of the fitting, and so mounted that the joint will be invisible in practically every position of the parts.

A further object of the invention is to provide a construction in which the face plate may be of different material than the collar or sleeve, or which may be of the same material and much thinner and more flexible than would be possible if formed integral with the collar or sleeve.

A further object is to provide such mutually adjustable two-piece collar in a form which shall prevent inadvertent separation of the parts thereof when not in use.

Still a further object is to provide a construction whereby the thrust of the face plate caused by forcing the same into close engagement with the back will be taken by the threaded portion of the sleeve that is in engagement with the threads on the shank of the faucet and will not cause tilting of the sleeve.

My two-piece collar is hereinafter more fully described and the essential characteristics of the invention embodying the same are set out in the claims.

In the drawings, Figure 1 is a side elevation, partly in section and partly in elevation, of my invention; Fig. 2 is a perspective view of the sleeve member of my fitting; Fig. 3 is a perspective view of the flange member of my fitting, and Fig. 4 is a cross section of my fitting, in place on the shank of a bib, showing the adaptation to inclined lavatory backs.

In Fig. 1 A represents any suitable faucet, cock or bib, having a shank $a$ provided with tapered threads $a'$ adjacent to its end, and parallel threads $a^2$ nearer the body. The parallel threads may be a continuation of the tapered threads at the same pitch, or they may be of some other pitch on a shank of larger diameter than the tapered threads. For an illustration of the latter form, reference is made to my re-issue patent referred to.

In Figs. 1 and 4, B indicates an ordinary elbow into which the shank of the cock screws, and C indicates a suitable lavatory back or similar slab, having a hole $c$ through which the shank passes.

A ring D provided with internal threads $d$ is mounted on a threaded portion of the shank and is provided with a rounded exterior $d^2$. The ring has a forwardly extending sleeve portion $d'$ (unthreaded and of larger internal diameter than the shank) which encircles the shank to conceal any threads in advance of the ring and thereby allows the ring to occupy various positions on the shank, for different lavatory backs, while maintaining a neat and sanitary connection with the shank. A bearing is provided on the rear or opposite side of the ring, preferably by means of the flange $d^3$ projecting from the ring approximately in line with the sleeve, being clear of the threads on the shank but of less diameter than the beaded exterior $d^2$ of the ring. Preferably the edge of this flange is flared to form a groove or socket rearward of the ring, the other wall of such socket being formed by the beaded portion $d^2$ of the ring. An annular face plate F, preferably made of very thin material so as to be yielding and resilient, is movably mounted in the socket on the ring. Preferably the inner edge $f$ of the plate is curved slightly to form substantially a ball-and-socket connection with the ring. This face-plate is dished or flared so that its outer edge 3 will be considerably in advance of its inner edge and will always engage a lavatory back or wall before the socket comes into contact therewith. The plane or line of the face plate is such that any thrust thereon will be communicated to the ring within the plane of the threads so that any tendency to tilt the sleeve will be avoided.

It will be seen from inspection of Fig. 4, that my construction readily adapts itself to lavatory backs and similar slabs, which are not strictly vertical, making a tight connection therewith and thus presenting a neat appearance and being sanitary in use. This is due to the connection between the flange member and collar member, as described and to the forward extension of the collar member which enables it to take various positions on the faucet shank.

I am aware that attempts have been made to mount a movable flange upon a projection formed directly upon a shank, but such construction is impractical, because it provides a projecting edge that is both unsightly and unsanitary and does not provide the tight joint possible with my construction, nor for the adjustment on the shank which enables the tipped face plate to lie snugly against any lavatory back.

By means of this construction the parts of the fitting may be manufactured very cheaply. The sleeve member may be conveniently cast, or turned from a piece of piping, and the face plate may be made of very thin material, indeed, so thin that it may be conveniently spun. The joint is concealed by the annular extension of the ring. A very tight joint is formed whenever the faucet is set into place, thus preventing access of foreign bodies or material into the space inclosed by the face plate. As the face plate adapts itself to the incline of the back it does not exert undue pressure at any point against the back, and thus there is no danger of cracking the enamel of the back where the face plate engages it. The face plate swivels in the socket so that the thrust is directed in a line passing through the plane of the threads that engage the shank, thus avoiding any tendency to tilt the sleeve though very few threads are used on the sleeve. The outward flanging of the rear end of the ring prevents separation of the face plate therefrom, so that when the ring is screwed onto the shank the entire fitting is complete and no parts are liable to be mislaid.

Having thus described my invention, what I claim is:

1. The combination, with a faucet having a threaded shank adapted to project through a lavatory back, of a ring internally threaded to engage the shank and provided with a rearwardly facing annular external bearing and an annular rib in front of said bearing, and a separate annular face plate on said bearing, said plate having an inner bearing edge loosely mounted to swivel on the annular bearing and bear against the rib, and an outer bearing edge positioned rearwardly thereof and adapted to be forced against the back by rearward movement of the ring.

2. The combination, with a faucet having a threaded shank adapted to project through a lavatory back, of a ring internally threaded to engage said shank and provided with a forwardly extending sleeve encircling a portion of the shank and clearing the threads thereon and a rearwardly extending flange substantially in line with the sleeve and an intermediately positioned external annular rib, and an annular face plate on said flange, said plate having an inner bearing edge of a less external diameter than the rib loosely mounted to swivel on the flange and bear against the rib and having an outer bearing edge positioned rearwardly of the flange and adapted to be forced against the back by rearward movement of the ring and hold the ring out of engagement with the back.

3. The combination, with a faucet having a shank, of a member secured on said shank, an annular face plate having a substantially ball and socket connection with said member, and means carried by the member and face plate for preventing their separation.

4. The combination with a faucet having a threaded shank, of an internally threaded sleeve member screwing onto the shank and having a forwardly extending internally cylindrical unthreaded portion and an external annular bead, and a thin disk-like face plate loosely surrounding the sleeve member at the rear of the bead and adapted to bear against said bead, the rear end of the sleeve member being bent outwardly behind the face plate to loosely lock it on the sleeve.

In testimony whereof, I hereunto affix my signature in the presence of two witnesses.

JOSEPH REGAR.

Witnesses:
ALBERT H. BATES,
ARCHER W. RICHARDS.